US012579889B2

(12) United States Patent
Yvk et al.

(10) Patent No.: US 12,579,889 B2
(45) Date of Patent: Mar. 17, 2026

(54) METHOD FOR USE IN AN AREA TRAFFICKED BY A PLURALITY OF VEHICLES

(71) Applicant: Volvo Truck Corporation, Gothenburg (SE)

(72) Inventors: Anjan Yvk, Bangalore (IN); Madhuchandra K S, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 180 days.

(21) Appl. No.: 18/499,438

(22) Filed: Nov. 1, 2023

(65) Prior Publication Data

US 2024/0161614 A1 May 16, 2024

(30) Foreign Application Priority Data

Nov. 10, 2022 (EP) .................................... 22206663

(51) Int. Cl.
*G08G 1/00* (2006.01)
*G08G 1/01* (2006.01)
*G08G 1/0967* (2006.01)

(52) U.S. Cl.
CPC ..... *G08G 1/096725* (2013.01); *G08G 1/0112* (2013.01); *G08G 1/0133* (2013.01); *G08G 1/20* (2013.01)

(58) Field of Classification Search
CPC ........... G08G 1/096725; G08G 1/0112; G08G 1/0133; G08G 1/20; G08G 1/0129;
(Continued)

(56) References Cited

U.S. PATENT DOCUMENTS 8,543,285 B2 * 9/2013 Allen ...................... G08G 1/017
705/13
2016/0229460 A1 * 8/2016 Kowalk .................... B60S 1/66
(Continued)

FOREIGN PATENT DOCUMENTS

CN 217227218 U 8/2022
WO 2019125276 A1 6/2019

OTHER PUBLICATIONS

CN217227218.translate (Year: 2022).*
(Continued)

*Primary Examiner* — B M M Hannan
(74) *Attorney, Agent, or Firm* — Withrow & Terranova, PLLC

(57) ABSTRACT

A method for use in a defined area trafficked by a plurality of vehicles comprising a detection system for detecting foreign objects located between a pair of tires of the vehicle, the method comprising receiving information from at least one vehicle relating to the detection of a foreign object by the detection system, and to a geographic position of the vehicle at a time of the detection; determining a number density of foreign objects along at least one travelling path within the defined area based on the information received from the vehicle; and suggesting or initiating a clearing operation to remove foreign objects from at least one portion of the travelling path once the determined number density of foreign objects in the portion of the travelling path fulfils a predetermined condition.

10 Claims, 4 Drawing Sheets

(58) Field of Classification Search
CPC ........ G08G 1/207; E02F 9/2045; E02F 9/205; E02F 9/2054; E02F 9/262
USPC .......................................................... 701/117
See application file for complete search history.

(56) References Cited

U.S. PATENT DOCUMENTS

| | | | | |
|---|---|---|---|---|
| 2019/0389258 | A1* | 12/2019 | Wen | B60C 25/138 |
| 2020/0150656 | A1* | 5/2020 | Lacaze | G05D 1/0214 |
| 2020/0290687 | A1* | 9/2020 | Magee | B62D 35/007 |
| 2021/0027622 | A1* | 1/2021 | Jiao | G08G 1/0112 |
| 2021/0097311 | A1* | 4/2021 | McBeth | G08G 1/096775 |
| 2021/0181737 | A1* | 6/2021 | Patnaik | B60C 23/06 |
| 2023/0368675 | A1* | 11/2023 | Gardner | G08G 1/0145 |

OTHER PUBLICATIONS

WO2019125276A1.FOR (Year: 2019).*
Extended European Search Report for European Patent Application 22206663.1, mailed Apr. 17, 2023, 10 pages.

* cited by examiner

METHOD FOR USE IN AN AREA TRAFFICKED BY A PLURALITY OF VEHICLES

RELATED APPLICATIONS

The present application claims priority to European Patent Application No. 22206663.1, filed on Nov. 10, 2022, and entitled "METHOD FOR USE IN AN AREA TRAFFICKED BY A PLURALITY OF VEHICLES," which is incorporated herein by reference in its entirety.

TECHNICAL FIELD

The disclosure relates generally to vehicle control. In particular aspects, the disclosure relates to a computer-implemented method for use in a defined area trafficked by a plurality of vehicles. The disclosure can be applied in areas trafficked by heavy-duty vehicles, such as trucks, buses, and construction equipment. Although the disclosure may be described with respect to a particular vehicle, the disclosure is not restricted to any particular vehicle.

BACKGROUND

In areas such as construction sites, quarries, or mining sites, it is common that objects such as stones and/or debris collect on haul roads of the site. Such objects may get stuck between a pair of tires of a dual wheel of a vehicle trafficking the site and cause problems such as tire punctures, resulting in vehicle downtime and repair costs. Objects stuck between the pair of tires of a vehicle wheel are also associated with a safety risk, since the objects may get catapulted from the dual wheel as the vehicle gains speed, and cause damage to, e.g., humans or other vehicles present near the vehicle.

In view of the above, there is a desire to keep the haul roads of areas such as construction sites, quarries, or mining sites free from objects that may get stuck between the tires of dual wheels of heavy-duty vehicles trafficking the area.

SUMMARY

According to a first aspect of the disclosure, a computer-implemented method for use in a defined area trafficked by a plurality of vehicles according to claim 1 is provided. Each vehicle comprises a detection system for detecting foreign objects located between a pair of tires of a dual wheel of the vehicle. The method comprises:

- receiving, in a processor device of a computer system, information from at least one vehicle of the plurality of vehicles relating to the detection of a foreign object by the detection system of the at least one vehicle, and to a geographic position of the at least one vehicle at a time of the detection,
- determining, by the processor device, a number density of foreign objects along at least one travelling path within the defined area based on the information received from the at least one vehicle,
- suggesting or initiating, by the processor device, a clearing operation to remove foreign objects from at least one portion of the at least one travelling path once the determined number density of foreign objects in the at least one portion of the at least one travelling path fulfils a predetermined condition.

The first aspect of the disclosure may seek to provide an in at least some aspect improved method for detecting and clearing foreign objects from travelling paths within an area such as a construction site, a quarry, or a mining site, from haul roads located within the site. Thanks to the information received from the vehicle(s) trafficking the area, it is possible to identify sub-areas within the defined area in which foreign objects, such as stones and debris, are likely to gather and cause problems for vehicles as the foreign objects get stuck between the tires of the vehicle. It is hence possible to quickly remove those objects and reduce on the one hand the risk of vehicle downtime due to tire repair and maintenance, and on the other hand the risk of accidents caused by catapulted objects.

The defined area in which the method is applied may of course also be trafficked by other vehicles, such as vehicles without dual wheels and/or without detection system.

By the number density of foreign object is intended a number of foreign objects per unit area, such as a number of foreign objects per square meter or similar. The number density may be determined from a number of detections along the travelling path during a certain time period, based on the number of vehicles trafficking the travelling path. The foreign objects are herein objects detectable by the detection system of the at least one vehicle, typically objects that are large enough to get stuck between the pair of tires. The foreign objects may typically be stones and/or debris.

Suggesting a clearing operation may be performed by presenting a suggestion via a user interface, such as by presenting a text message and/or image data, for example a text message in combination with a map on which the at least one portion of the at least one travelling path which needs to be cleared is highlighted. A user who is presented with the information may thereby initiate the clearing operation at a suitable point in time. Initiating the clearing operation may alternatively be performed in an automated manner, such as by automatically controlling an automated vehicle, such as an automated dozer, to clear the at least one portion of the at least one travelling path. Such an automatic clearing operation may also be scheduled for a suitable point in time, such as a point in time when trafficking of the at least one travelling path is expected to be relatively low.

Optionally, the predetermined condition is considered fulfilled once the determined number density of foreign objects reaches or exceeds a first threshold level in the at least one portion of the at least one travelling path. By using a threshold, clearing may be initiated only when there is a risk that the number density of objects is relatively large, such that the risk of objects getting stuck between the tires is significant.

Optionally, the first threshold level is set in dependence on a number of vehicles comprised in the plurality of vehicles. If the number of vehicles is relatively large, the threshold level may be set to a relatively large value, and if the number of vehicles is relatively small, the threshold level may be set to a smaller value, taking into account the fewer number of detections that are likely to occur if the area is trafficked by a smaller number of vehicles.

Optionally, for the predetermined condition to be considered fulfilled, an accumulated size of the at least one portion of the at least one travelling path must reach or exceed a threshold size. Hence, if the at least one portion comprises more than one portions, the areas of those portions are summed up and compared to the threshold size. If the at least one portion comprises a single portion, the size of that portion is compared to the threshold size. This avoids unnecessary clearing of insignificant portions of the defined area. However, in some cases, it may be beneficial to clear a portion comprising a large amount of foreign objects that may get stuck, regardless of the size of the portion. This may, e.g., be the case if the portion is located in a highly trafficked part of the area where a large amount of vehicle passages is likely to occur. Different threshold sizes may be set for different locations within the area, e.g., a smaller threshold size at a highly trafficked crossroad than along a relatively low-trafficked road.

Optionally, determining the number density of foreign objects comprises generating a heat map of the defined area, wherein the heat map visualises the determined number density. This provides information which is easy to interpret for a user, such as for an operator of a dozer or similar who is to plan and/or perform the clearing operation.

Optionally, the method further comprises analysing the determined number density over time to identify at least one travelling path along which the number density of foreign objects is likely to reach or exceed a second threshold level at a future time instant. The first and second threshold levels may be set to be the same, but they may also be set to differ. In this way, preventive measures for avoiding future collection of foreign objects along the detected travelling path may be taken.

Optionally, the at least one travelling path along which the number density of foreign objects is likely to reach or exceed the second threshold level is at least one travelling path along which the predetermined condition has repeatedly been fulfilled. By “repeatedly” may herein be understood as at least a defined number of times, such as at least twice. Furthermore, a time period may be defined within which the predetermined condition has repeatedly been found to be fulfilled.

Optionally, the method further comprises identifying at least one action to take in response to identifying the at least one travelling path along which the number density of foreign objects is likely to reach or exceed the second threshold level. The action may be a preventive action, such as modifying the vehicle body to better prevent objects or debris from falling off the vehicle during transport or putting up safety nets or similar along the travelling path to cover cliffs and prevent stones etc. from falling from the cliffs and onto the travelling path.

Optionally, the method further comprises initiating said at least one identified action, and/or presenting said at least one identified action via a user interface. Thus, the method may comprise an automatic initialisation of the identified action(s), and/or a presentation to a user. For example, multiple identified actions may be presented to the user via the user interface, whereby the user can select the most appropriate action(s) and a suitable point in time for performing the action.

According to a second aspect of the disclosure, a computer system comprising a processor device is provided. The processor device is configured to:

- from at least one vehicle of a plurality of vehicles trafficking a defined area, receive information relating to a detection of a foreign object located between a pair of tires of a dual wheel of the vehicle by a detection system of the at least one vehicle, and to a geographic position of the at least one vehicle at a time of the detection,
- determine a number density of foreign objects along at least one travelling path within the defined area based on the information received from the at least one vehicle,
- suggest or initiate a clearing operation to remove foreign objects from at least one portion of the at least one travelling path once the determined number density of foreign objects in the at least one portion of the at least one travelling path fulfils a predetermined condition.

According to a third aspect of the disclosure, a control system comprising a processor device configured to perform the method according to the first aspect is provided.

According to a fourth aspect of the disclosure, a computer program product comprising program code for performing, when executed by a processor device, the method according to the first aspect, is provided.

According to a fifth aspect of the disclosure, a non-transitory computer-readable storage medium is provided. The non-transitory computer-readable storage medium comprises instructions, which when executed by a processor device, cause the processor device to perform the method according to the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 2 is a schematic overview of a plurality of vehicles trafficking a defined area.

The drawings are schematic and not drawn to scale.

DETAILED DESCRIPTION

Aspects set forth below represent the necessary information to enable those skilled in the art to practice the disclosure.

Figure 1:
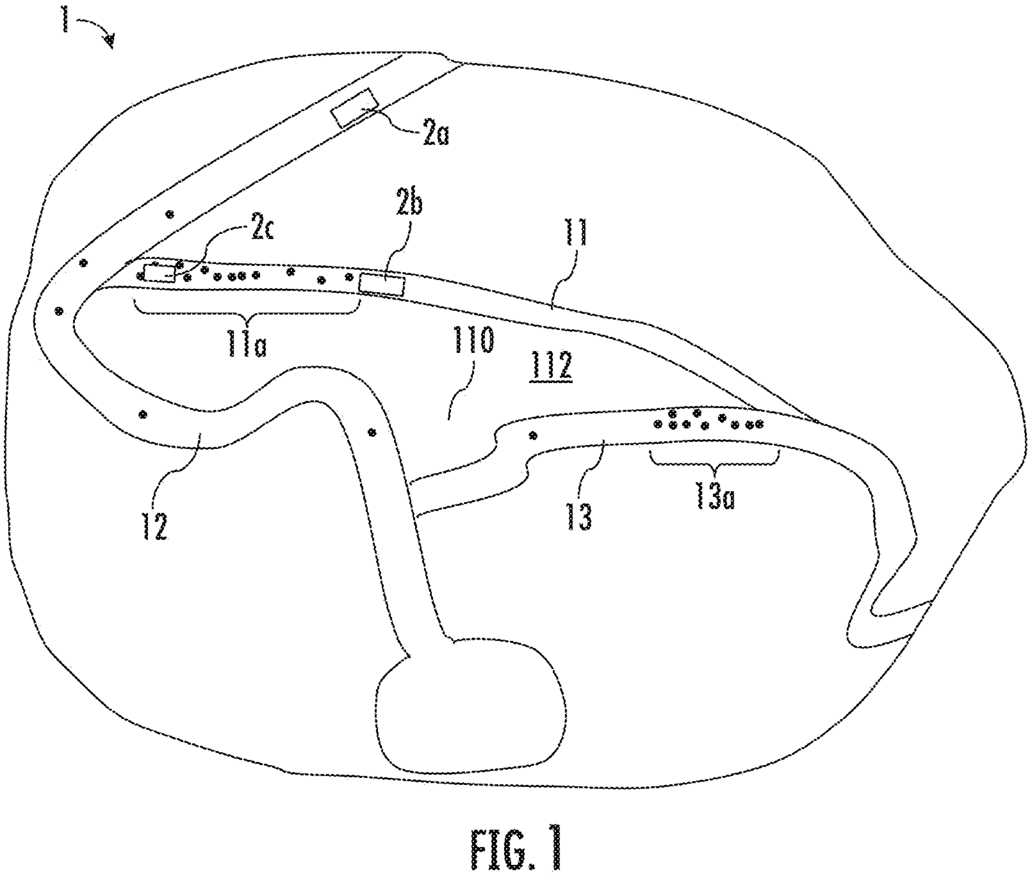
FIG. 1 illustrates a defined area in which a method according to the disclosure may be performed.

FIG. 1 is a schematic view of a plurality of vehicles, herein three vehicles 2*a*, 2*b*, 2*c*, trafficking a defined area 1, such as a mining site, a quarry or similar. The area 1 comprises a plurality of travelling paths 11, 12, 13 in the form of haul roads along which the vehicles 2*a*, 2*b*, 2*c* travel. On the haul roads 11, 12, 13, foreign objects such as stones and debris, illustrated as black dots, are located in various number densities depending on location within the area 1. For example, a first haul road 11 and a third haul road 13 comprise first portions 11*a*, 13*a*, respectively, along which the number densities of foreign objects are relatively high. A second haul road 12 does not comprise any such portion, but instead exhibits a relatively low number density of foreign objects in comparison with the first portions 11*a*, 13*a* of the first and third haul roads 11, 13, respectively.

Figure 2:
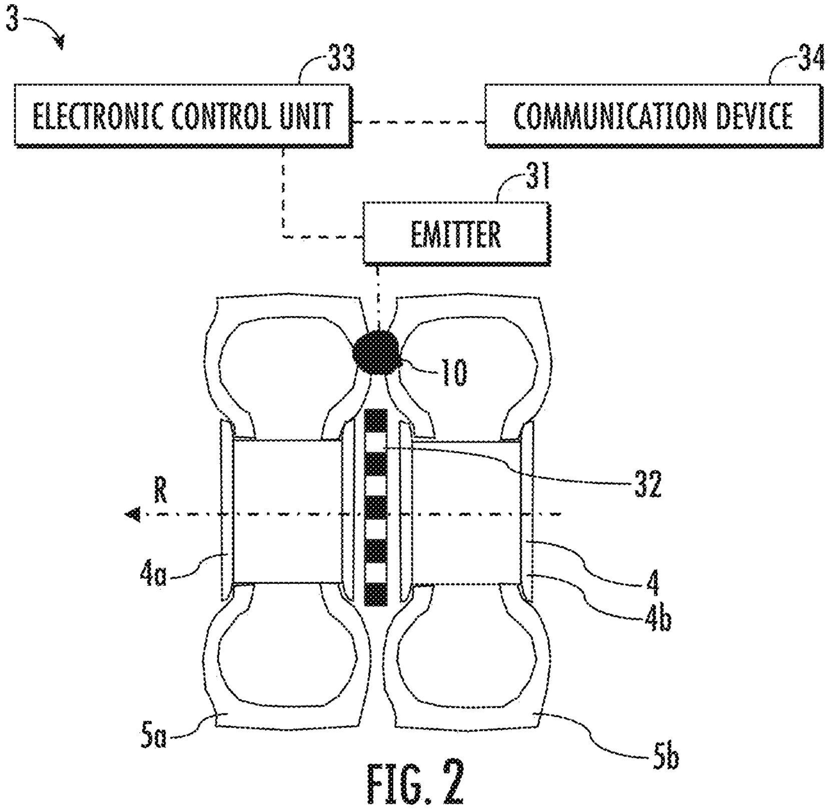
FIG. 2 schematically illustrates a dual wheel and an object detection system of a vehicle.

The vehicles 2*a*, 2*b*, 2*c* may, e.g., be in the form of dump trucks or similar heavy-duty vehicles. Each one of the vehicles 2*a*, 2*b*, 2*c* may comprise at least one dual wheel 4 as the one illustrated in FIG. 2, typically several dual wheels 4 such as at least a one rear pair of dual wheels and at last one front pair of dual wheels 4. Each dual wheel 4 comprises first and second wheels 4*a*, 4*b* fitted, i.e., coupled adjacent to one another, on one side of a wheel axle. The dual wheel 4 hence comprises a pair of tires 5*a*, 5*b*, each tire 5*a*, 5*b* being mounted on one of the first and second wheels 4*a*, 5*a*, respectively. As one of the vehicles 2*a*, 2*b*, 2*c* drives along the travelling paths 11, 12, 13, and in particular along the first portions 11*a*, 13*a*, a foreign object 10 may get stuck between the pair of tires 5*a*, 5*b*. In order to detect such objects, each vehicle 2*a*, 2*b*, 2*c* comprises a detection system 3 configured to detect foreign objects 10 located between the pair of tires 5*a*, 5*b*.

The detection system 3 comprises an emitter 31, which may be installed radially outside of the dual wheel 4, such as in a fender or on a support of a vehicle chassis. The detection system further comprises an annular detector 32 provided between the pair of tires 5*a*, 5*b*, centred on a rotational axis R of the dual wheel 4. The emitter is configured to emit a signal that can be detected by the detector 32, such as a laser signal or similar. The detection system 3 also comprises an electronic control unit 33 and a communication device 34 configured to communicate information relating to a detection of a foreign object 10 between the pair of tires 5*a*, 5*b*, and optionally emit a warning signal, such as an audible or visible warning signal. When a foreign object 10 is located between the tires 5*a*, 5*b*, the signal between the emitter 31 and the detector 32 gets interrupted by the object 10 upon every revolution of the dual wheel 4. The detection system 3 is thereby adapted to detect the object 10. The detection system 3 can be implemented in various different ways, such as by mounting the emitter between the tires 5*a*, 5*b* and the detector radially outside of the dual wheel, or by mounting both of the detector and emitter radially outside of the dual wheel, such as in front of and rearward of the wheel, respectively. The detection system may further comprise a camera or similar for detecting an object between the tires 5*a*, 5*b*.

Figure 3:
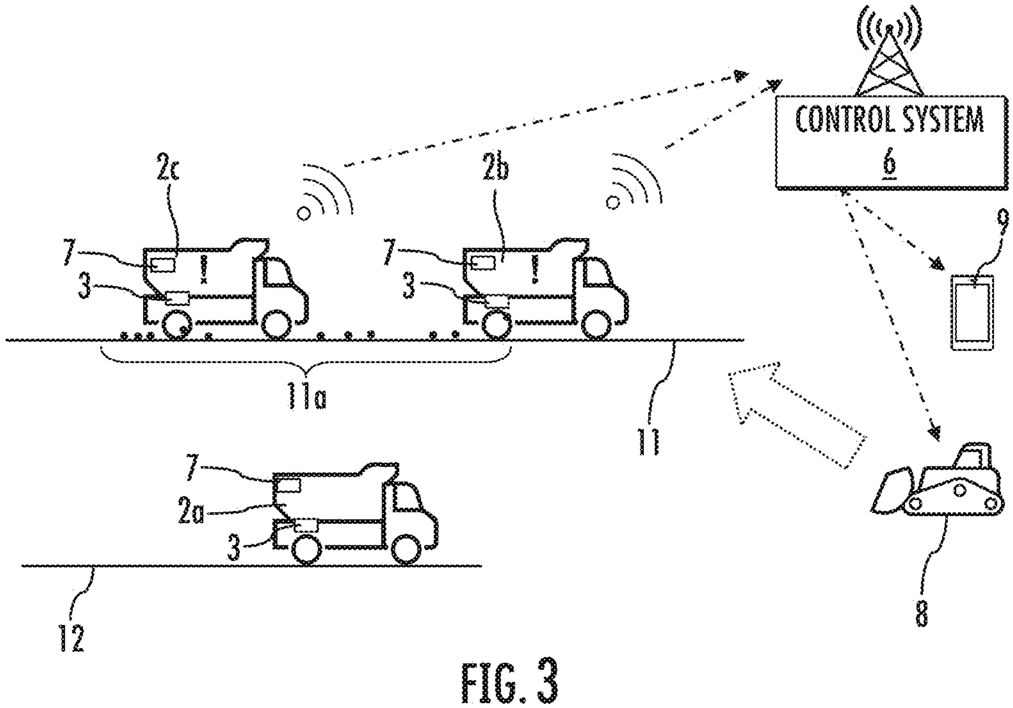

FIG. 3 schematically illustrates the vehicles 2*a*, 2*b*, 2*c*, each comprising an object detection system 3 as described above with reference to FIG. 2. A first vehicle 2*a* is travelling on the second haul road 12 as illustrated in FIG. 1, herein illustrated without foreign objects. A second vehicle 2*b* is just about to leave the first portion 11*a* of the first haul road 11, where the number density of foreign objects is relatively high. A third vehicle 2*c* is travelling along the first portion 11*a* of the first haul road 11. Both the second and the third vehicles 2*b*, 2*c* have foreign objects stuck between rear dual wheels of the vehicles 2*b*, 2*c*, as detected by a respective object detection system 3 of the vehicles 2*b*, 2*c*. The communication devices 34 of the object detection system 3 may herein be configured to wirelessly communicate data/information to a control system 6 located remotely from the vehicles 2*a*, 2*b*, 2*c*, or to communicate data to another communication unit (not shown) within the vehicle 2*a*, 2*b*, 2*c* or outside of the vehicle 2*a*, 2*b*, 2*c*, which is in turn configured to communicate information to the control system 6.

The control system 6 may, in other examples, be provided in any one of the vehicles 2*a*, 2*b*, 2*c*. The control system 6 may comprise one or more electronic control units, also referred to as processor devices, and will be described in further detail below. All of the one or more electronic control units may be provided in any one of the vehicles 2*a*, 2*b*, 2*c*, or a first part of them may be provided in any one of the vehicles 2*a*, 2*b*, 2*c* and a second part of them may be located at some other location, e.g., in a remote location, etc.

Each one of the vehicles 2*a*, 2*b*, 2*c* further comprises a localization system 7 configured to determine a geographic position of the vehicle 2*a*, 2*b*, 2*c*. The localization system 7 may comprise a satellite navigation device (not shown) and one or more sensors (not shown) attached to a drivetrain of the vehicle 2*a*, 2*b*, 2*c*, e.g., an accelerometer, a gyroscope, a magnetometer, etc., enabling dead reckoning. The localization system 7 may further comprise one or more object detection sensors (not shown) such as at least one radar-based sensor, and/or at least one Light Detection and Ranging (LIDAR)-based sensor, and/or at least one camera, arranged to provide views of an area surrounding the vehicle 2*a*, 2*b*, 2*c*. The localization system 7 is configured to communicate a geographic position of the vehicle 2*a*, 2*b*, 2*c*, such as coordinates of the vehicle 2*a*, 2*b*, 2*c*, to the control system 7, at least when a foreign object 10 is first detected by the object detection system 3. Position data may either be communicated directly via wireless communication or by using an intermediate unit for the communication. For example, data relating to the detection of a foreign object 10 by the object detection system 3 and position data relating to the geographic position of the vehicle 2*a*, 2*b*, 2*c* at the time of first detecting the foreign object 10 may be communicated together to the control system 6, or separately.

Figure 4:
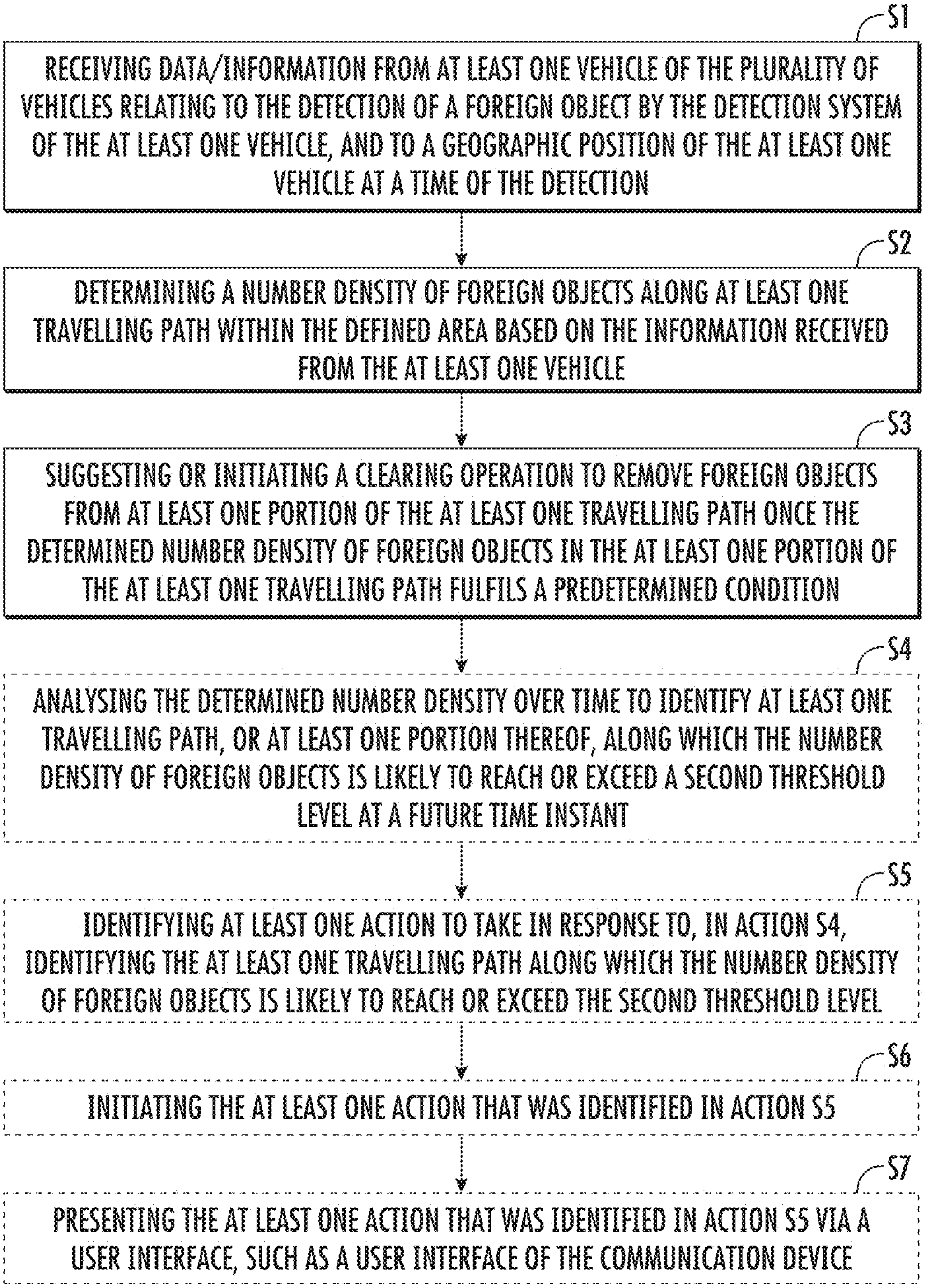
FIG. 4 is a flow chart illustrating a method according to an example.

FIG. 4 illustrates a computer-implemented method according to an example of the disclosure that may, e.g., be carried out by a processor device of the control system 6. Optional actions are marked by dashed lines. Unless otherwise indicated, the actions may be performed in any suitable order.

The method comprises a first action S1 of receiving data/information from at least one vehicle 2*a*, 2*b*, 2*c* of the plurality of vehicles 2*a*, 2*b*, 2*c* relating to the detection of a foreign object by the detection system 3 of the at least one vehicle 2*a*, 2*b*, 2*c*, and to a geographic position of the at least one vehicle 2*a*, 2*b*, 2*c* at a time of the detection. The data/information may be received in a receiving unit (not shown) of the control system 6.

Figure 5:
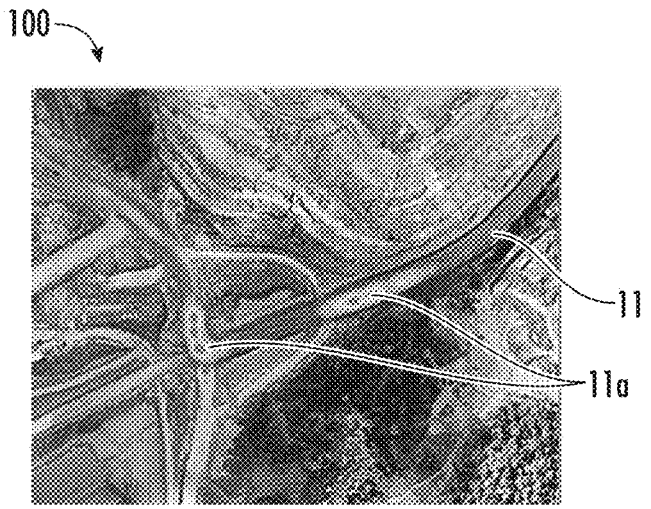
FIG. 5 is a schematic heat map of an area comprising foreign objects.

In a second action S2, subsequent to the first action S1, the method comprises determining a number density of foreign objects 10 along at least one travelling path 11, 12, 13 within the defined area 1 based on the information received from the at least one vehicle 2*a*, 2*b*, 2*c*. The accuracy of the determination increases with the number of vehicles 2*a*, 2*b*, 2*c* trafficking the area. The accuracy may vary within the area 1, such as to be higher in more trafficked parts of the area and lower in less trafficked parts. An accuracy level may be determined in connection with determining the number density. Determining the number density of foreign objects 10 may comprise generating a heat map 100 of the defined area 1. FIG. 5 illustrates such a heat map 100 of at least a portion of an area 1, wherein the heat map 100 visualises the determined number density. The heat map 100 may, e.g., use different colours or shades to illustrate the number density of foreign objects 10 along the travelling paths 11, 12, 13 within the area 1.

In a third action S3, subsequent to the second action S2, the method comprises suggesting or initiating a clearing operation to remove foreign objects 10 from at least one portion 11*a*, 13*a* of the at least one travelling path 11, 12, 13 once the determined number density of foreign objects 10 in the at least one portion 11*a*, 13*a* of the at least one travelling path 11, 12, 13 fulfils a predetermined condition. The condition may, e.g., be considered fulfilled when the number density reaches or exceeds a first threshold level in the at least one portion 11*a*, 12*a* of the at least one travelling path 11, 12, 13. In the heat map 100 illustrated in FIG. 5, the number density is visualised as exceeding the first threshold level along the portions 11*a* of the travelling path 11. The first threshold level may be set in dependence on the number of vehicles 2*a*, 2*b*, 2*c* comprised in the plurality of vehicles 2*a*, 2*b*, 2*c*. Moreover, if the area 1 is trafficked by a plurality of vehicles having dual wheels 4, but lacking a detection system 3 for detecting foreign objects 10 located between the tires, the first threshold level may be set by taking this into account. With more vehicles without detection system 3 trafficking the area 1, the first threshold level may be set to a lower value than with a fewer number of vehicles without detection system 3 trafficking the area 1.

The clearing operation may e.g., be performed by at least one dozer 8 as illustrated in FIG. 3. The dozer 8 may be an automated dozer or a manually operated dozer. To initiate or suggest the clearing operation, a message may be sent from the control system 6 to a control unit of the dozer 8, and/or to a communication device 9 of an operator in charge of operation of the dozer 8, such as a cell phone, a laptop, a tablet, or similar. When the method comprises suggesting the clearing operation, it may be presented to the operator via a user interface of the communication device 9 or of the dozer 8, as an audible message and/or as a visible message.

It is further possible to set the predetermined condition so that it is only considered fulfilled when an accumulated size of the at least one portion 11*a*, 13*a* of the at least one travelling path 11, 12 13 reaches or exceeds a threshold size.

In an optional fourth action S4, the method comprises analysing the determined number density over time to identify at least one travelling path 11, 12, 13, or at least one portion thereof, along which the number density of foreign objects 10 is likely to reach or exceed a second threshold level at a future time instant. In this way, high-risk zones in which foreign objects 10 are likely to gather are identified based on historical data. The second threshold level may be the same as the first threshold level, or it may differ therefrom. The at least one travelling path 11, 12, 13 along which the number density of foreign objects 10 is likely to reach or exceed the second threshold level may be a travelling path along which the predetermined condition has repeatedly been fulfilled.

In an optional action S5, the method comprises identifying at least one action to take in response to, in action S4, identifying the at least one travelling path along which the number density of foreign objects 10 is likely to reach or exceed the second threshold level. This may be a preventive action.

In an optional action S6, the method further comprises initiating the at least one action that was identified in action S5.

In an optional action S7, taken in addition to or as an alternative to the action S6, the method comprises presenting the at least one action that was identified in action S5 via a user interface, such as a user interface of the communication device 9. The user interface may be a graphic user interface for presenting a visual message, such as a screen of a cell phone, a tablet, a laptop, a computer, or similar. The user interface may also be a speaker or similar for presenting an audible message.

Figure 6:
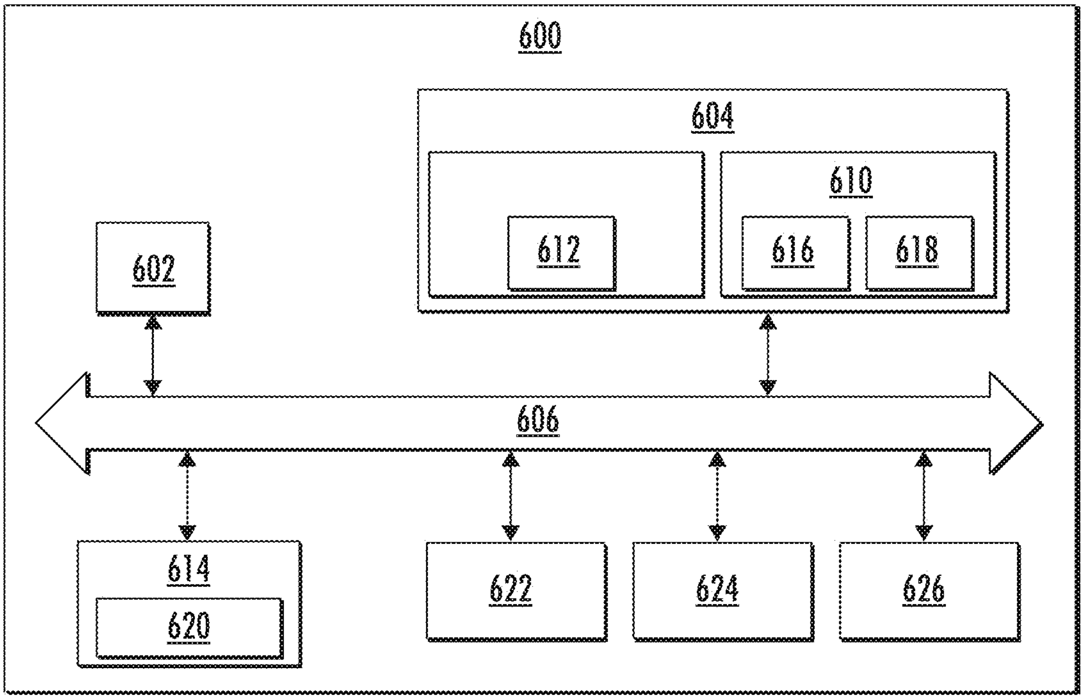
FIG. 6 is a schematic diagram of an exemplary control system for implementing examples disclosed herein, according to one example.

FIG. 6 is a schematic diagram of a computer system 600 for implementing examples disclosed herein, such as in the control system 6 illustrated in FIG. 3. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, the computer system may include a single control unit, or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include one or more electronic control units 602, which may also be referred to as a processor device, a memory 604, and a system bus 606. The computer system 600 may include at least one computing device having the control unit 602. The system bus 606 provides an interface for system components including, but not limited to, the memory 604 and the control unit 602. The control unit 602 may include any number of hardware components for conducting data or signal processing or for executing computer code stored in memory 604. The control unit 602 (e.g., processor device) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The control unit may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the control unit 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EE- PROM), etc.), and volatile memory 610 (e.g., random-access memory (RAM)), or any other medium which can be used to carry or store desired program code in the form of machine-executable instructions or data structures and which can be accessed by a computer or other machine with a control unit 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the control unit 602 to carry out the steps described herein. Thus, the computer-readable program code can comprise software instructions for implementing the functionality of the examples described herein when executed by the control unit 602. The control unit 602 may serve as a controller or control system for the computer system that is to implement the functionality described herein, such as for the control system 6 illustrated in FIG. 3.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 626 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer-implemented method for use in a defined area trafficked by a plurality of vehicles, each vehicle comprising a detection system for detecting a foreign object located between a pair of tires of a dual wheel of the vehicle, the method comprising:

receiving, in a processor device of a computer system, detection data from at least one vehicle of the plurality of vehicles relating to the detection of the foreign object by the detection system of the at least one vehicle, and to a geographic position of the at least one vehicle at a time of the detection;

determining, by the processor device, a number density of foreign objects along at least one travelling path within the defined area based on the detection data received from the at least one vehicle; and controlling an automated vehicle, by the processor device, to remove the foreign objects from at least one portion of the at least one travelling path once the determined number density of the foreign objects in the at least one portion of the at least one travelling path fulfils a predetermined condition comprising reaching or exceeding a first threshold level set in dependence on a number of vehicles comprised in the plurality of vehicles.

2. The method of claim 1, wherein, for the predetermined condition to be considered fulfilled, an accumulated size of the at least one portion of the at least one travelling path must reach or exceed a threshold size.

3. The method of claim 1, wherein determining the number density of the foreign objects comprises generating a heat map of the defined area, wherein the heat map visualises the determined number density.

4. The method of claim 1, further comprising:

analyzing the determined number density over time to identify at least one travelling path along which the number density of the foreign objects is predicted to reach or exceed a second threshold level at a future time instant.

5. The method of claim 4, wherein the at least one travelling path along which the number density of the foreign objects is predicted to reach or exceed the second threshold level is at least one travelling path along which the predetermined condition has repeatedly been fulfilled.

6. The method of claim 5, further comprising:

identifying at least one action to take in response to identifying the at least one travelling path along which the number density of the foreign objects is predicted to reach or exceed the second threshold level.

7. The method of claim 6, further comprising:

initiating the at least one identified action; and/or presenting the at least one identified action via a user interface.

8. A control system comprising a processor device configured to:

receive, by the processor device, detection data from at least one vehicle of a plurality of vehicles relating to detection of a foreign object by a detection system of the at least one vehicle, the detection system located between a pair of tires of a dual wheel of the at least one vehicle, and to a geographic position of the at least one vehicle at a time of the detection;

determine, by the processor device, a number density of foreign objects along at least one travelling path within a defined area based on the detection data received from the at least one vehicle; and control, by the processor device, an automated vehicle to remove the foreign objects from at least one portion of the at least one travelling path once the determined number density of the foreign objects in the at least one portion of the at least one travelling path fulfils a predetermined condition comprising reaching or exceeding a first threshold level set in dependence on a number of vehicles comprised in the plurality of vehicles.

9. A non-transitory computer readable storage medium having stored therein program code executable by a processor device to:

receive, by a processor device, detection data from at least one vehicle of a plurality of vehicles relating to detection of a foreign object by a detection system of the at least one vehicle, the detection system located between a pair of tires of a dual wheel of the at least one vehicle, and to a geographic position of the at least one vehicle at a time of the detection;

determine, by the processor device, a number density of foreign objects along at least one travelling path within a defined area based on the detection data received from the at least one vehicle; and control, by the processor device, an automated vehicle to remove the foreign objects from at least one portion of the at least one travelling path once the determined number density of the foreign objects in the at least one portion of the at least one travelling path fulfils a predetermined condition comprising reaching or exceeding a first threshold level set in dependence on a number of vehicles comprised in the plurality of vehicles.

10. A non-transitory computer-readable storage medium comprising instructions, which when executed by a processor device, cause the processor device to:

receive, by the processor device, detection data from at least one vehicle of a plurality of vehicles relating to detection of a foreign object by a detection system of the at least one vehicle, the detection system located between a pair of tires of a dual wheel of the at least one vehicle, and to a geographic position of the at least one vehicle at a time of the detection;

determine, by the processor device, a number density of foreign objects along at least one travelling path within a defined area based on the detection data received from the at least one vehicle; and control, by the processor device, an automated vehicle to remove the foreign objects from at least one portion of the at least one travelling path once the determined number density of the foreign objects in the at least one portion of the at least one travelling path fulfils a predetermined condition comprising reaching or exceeding a first threshold level set in dependence on a number of vehicles comprised in the plurality of vehicles.

* * * * *